US006466354B1

(12) United States Patent
Gudeman

(10) Patent No.: US 6,466,354 B1
(45) Date of Patent: Oct. 15, 2002

(54) METHOD AND APPARATUS FOR INTERFEROMETRIC MODULATION OF LIGHT

(75) Inventor: Christopher Gudeman, Los Gatos, CA (US)

(73) Assignee: Silicon Light Machines, Sunnyvale, CA (US)

( * ) Notice: Subject to any disclaimer, the term of this patent is extended or adjusted under 35 U.S.C. 154(b) by 0 days.

(21) Appl. No.: 09/664,020

(22) Filed: Sep. 19, 2000

(51) Int. Cl.[7] .............................. G02F 1/03; G02F 1/07; G02B 26/02; G02B 26/00
(52) U.S. Cl. ...................... 359/247; 359/231; 359/290; 359/291; 359/295
(58) Field of Search ................................ 359/656–661, 359/672, 673, 675, 802, 803, 104, 237, 240, 244–248, 254, 261, 263, 265, 273, 290, 291, 295, 296, 298; 250/227.14–227.19; 256/450; 382/211

(56) References Cited

U.S. PATENT DOCUMENTS

| 5,311,360 | A | | 5/1994 | Bloom et al. ................ 359/572 |
| 5,661,592 | A | | 8/1997 | Bornstein et al. ........... 359/291 |
| 5,691,836 | A | * | 11/1997 | Clark .......................... 359/247 |
| 5,825,528 | A | * | 10/1998 | Goossen ...................... 359/291 |
| 5,835,255 | A | | 11/1998 | Miles .......................... 359/291 |
| 5,841,579 | A | | 11/1998 | Bloom et al. ................ 359/572 |
| 5,986,796 | A | * | 11/1999 | Miles .......................... 359/260 |
| 6,055,090 | A | | 4/2000 | Miles .......................... 359/291 |
| 6,061,166 | A | | 5/2000 | Furlani et al. ............... 359/254 |
| 6,185,033 | B1 | * | 2/2001 | Bosc et al. ................... 359/254 |
| 6,195,196 | B1 | * | 2/2001 | Kimura et al. ............... 359/295 |

OTHER PUBLICATIONS

A.P. Payne et al. "Resonance Measurements of Stresses in Al/Si3N4 Micro–Ribbons" Silcon Light Machines, 385 Moffett Park Dr., Sunnyvale CA, USA, Sep. 22, 1999, 11 pages.

A. Payne et al. "Resonance Measurements of Stresses in Al/Si3N4 Micro–Ribbons" Silicon Light Machine, Sunnyvale CA, Sep. 22, 1999, p. 1–12.

M. W. Miles "A New Reflective FPD Technology Using Interferometric Modulation" Etalon, Inc., Boston, MA., 4 pages.

K.W. Goossen et al. "Silicon Modulator Based on Mechanically–Active Anti–Reflection Layer with 1 Mbit/sec Capability for Fiber–in–the–Lop Applications" IEEE Photonics Technology Letters, vol. 6, No. 9, Sep. 1994, pp. 1119–1121.

J.A. Walker et al. "Demonstration of a Gain Flattened Optical Amplifier with a Micromechanical Equalizer Element," Lucent Technologies, Bell Laboratories, Holmdel, NJ 07733, p. 13–14.

O. Solgaard et al. "Deformable Grating Optical Modulator" E.L. Ginzton Laboratory, Optics Letters, vol. 17, May 1, 1992, p. 688–690.

Eugene Hecht, "Optics" Second Edition, 1987, p. 368–372.

* cited by examiner

Primary Examiner—Jordan Schwartz
Assistant Examiner—William Choi
(74) Attorney, Agent, or Firm—Haverstock & Owens LLP

(57) ABSTRACT

An interferometric light modulator includes a base and a ribbon suspended above the base. The ribbon has a central region and first and second conducting regions located outside of the central region. The ribbon includes a first mirror between the first and second conducting regions. The base includes a second mirror located parallel and adjacent to the first mirror so that the first and second mirrors form an interferometric cavity. An electrical bias applied to the first and second conducting regions adjusts the interferometric cavity in order to modulate light which is incident upon the central region of the ribbon. In an alternative interferometric light modulator, the light is incident upon a second central region of the base.

7 Claims, 2 Drawing Sheets

METHOD AND APPARATUS FOR INTERFEROMETRIC MODULATION OF LIGHT

FIELD OF THE INVENTION

This invention relates to the field of light modulators. More particularly, this invention relates to the field of light modulators where light is modulated via a variable interferometric structure.

BACKGROUND OF THE INVENTION

Charles Fabry and Alfred Perot invented the Fabry-Perot interferometer in the late 1800's. The Fabry-Perot interferometer includes two glass plates that have been lightly silvered on facing surfaces. The glass plates are arranged parallel to each other so that the lightly silvered surfaces produce an interference cavity defined by a separation distance between the glass plates. If the separation distance is fixed, the Fabry-Perot interferometer is referred to as a Fabry-Perot etalon.

In either the Fabry-Perot interferometer or the Fabry-Perot etalon, the interference cavity causes multiple beam interference. The multiple beam interference occurs when first and second partially reflecting surfaces are oriented parallel to each other and illuminated by light. Provided that reflection coefficients for the first and second partially reflecting surfaces are not small, the light reflects between the two partially reflecting surfaces multiple times. This produces a transmitted multiple beam interference for the light exiting the second surface in a forward direction and a reflected multiple beam interference for the light exiting the first surface in a reverse direction.

If the Fabry-Perot interferometer is illuminated by a broad light source and the transmitted multiple beam interference is collected by a focusing lens, a circular interference pattern is produced on a screen at a focal length of the focusing lens. The circular interference pattern exhibits bright narrow rings of light separated by larger dark rings.

Goossen et al. in "Silicon modulator based on mechanically-active anti-reflection layer with 1 Mbit/sec capability for fiber-in-the-loop applications," *IEEE Phtonics Technology Letters*, Vol. 6, No. Sep. 9, 1994, pp. 1119–1121, teach a mechanical anti-reflection optical switch. The optical switch consists of a $SiN_x$ membrane suspended over a Si substrate. The $SiN_x$ membrane has a square shape and is suspended from corners by arms. The $SiN_x$ layer has a thickness of a quarter wavelength of incident light. A $SiN_x$ index of refraction for the $SiN_x$ layer is a square root of a Si index of refraction for the Si substrate. When an air gap separating the $SiN_x$ membrane from the Si substrate is an even multiple of a quarter wavelength, an antireflection condition exists. When the air gap is an odd multiple of a quarter wavelength of the incident light, a high reflection condition exists. The optical switch is in an off-state when the anti-reflection condition exists and is an on-state when the high reflection condition exists.

Fabricating the $SiN_x$ membrane so that the $SiN_x$ index of refraction is the square root of the Si index of refraction is difficult. Further, fabricating the arms and the $SiN_x$ membrane in a reproducible manner so that production devices operate in a similar manner is difficult. Moreover, it is desirable to have an optical switch which is more economical to produce than the optical switch taught by Goossen et al.

Miles, in U.S. Pat. No. 5,835,255 issued on Nov. 10, 1998 and entitled, "Visible Spectrum Modulator Arrays," teaches a micro-fabricated interferometric light modulator. The micro-fabricated interferometric light modulator includes a transparent substrate and a membrane suspended above the substrate. The transparent substrate includes first and second surfaces, and also includes a transparent film on the second surface. The transparent film is conductive. A mirror, either a metal or dielectric mirror, lies on the transparent film. The membrane is suspended above the mirror. The membrane is both reflective and conductive. The membrane and the mirror form an interferometric cavity which is modulated by biasing the membrane relative to the transparent film. In operation, the micro-fabricated light modulator modulates light incident upon the first surface of the transparent substrate by interferometrically causing the incident light to exit the first surface or by interferometrically causing the incident light to not exit the first surface.

Miles further teaches an alternative micro-fabricated interferometric light modulator in which the membrane is a square membrane. The square membrane is suspended by arms from centers of each of four lengths defining the square membrane.

Fabricating the transparent and conducting film of the micro-fabricated light modulators is difficult. Further, keeping a separation distance defining the interferometric cavity of the micro-fabricated light modulators constant across the interferometric cavity is difficult. Additionally, the micro-fabricated interferometric light modulators appear to operate in reflection only while it would be desirable to have an interferometric light modulator which operates in both reflection and transmission.

Moreover, it is desirable to have an interferometric light modulator which is more economical and reproducible than the micro-fabricated interferometric light modulators taught by Miles.

What is needed is an interferometric light modulator which is economical to fabricate.

What is needed is an interferometric light modulator which is more easily reproducible in a production setting.

What is needed is an interferometric light modulator that does not rely on arms to support a moving surface.

What is needed is an interferometric light modulator which does not rely on a specific relation between the indexes of refraction of two bulk elements.

What is needed is an interferometric light modulator which does not require use of a transparent film which is also conducting.

What is needed is an interferometric light modulator which operates in transmission as well as reflection.

SUMMARY OF THE INVENTION

The present invention is an interferometric light modulator. The interferometric light modulator includes a base and a ribbon suspended above the base. The ribbon has a central region, and first and second conducting regions located outside of the central region. The ribbon includes a first mirror between the first and second conducting regions. The base includes a second mirror located parallel and adjacent to the first mirror so that the first and second mirrors form an interferometric cavity. An electrical bias applied to the first and second conducting regions adjusts the interferometric cavity in order to modulate light which is incident upon the central region of the ribbon. In an alternative interferometric light modulator, the light is incident upon a second central region of the base.

DETAILED DESCRIPTION OF THE PREFERRED EMBODIMENT

Figure 1:
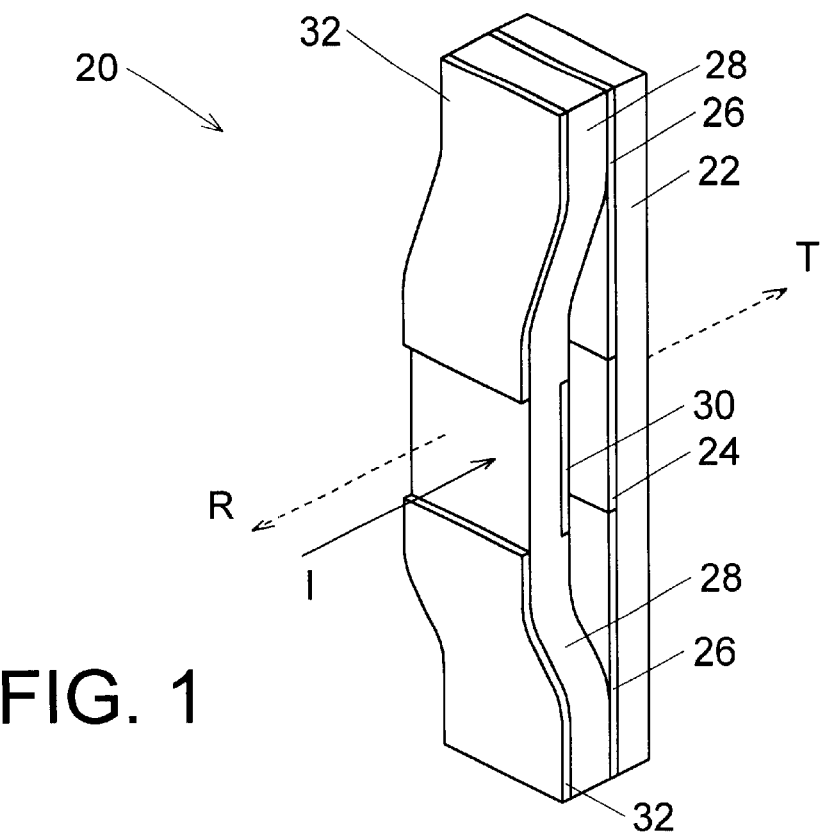
FIG. 1 isometrically illustrates the preferred interferometric light modulator of the present invention.

The preferred interferometric light modulator of the present invention is illustrated in FIG. 1. The preferred interferometric light modulator 20 includes a base 22, a first mirror 24, first conductors 26, a ribbon 28, a second mirror 30, and second conductors 32. Preferably, in operation, incident light I illuminates a first central region of the ribbon 28. Alternatively, the incident light I illuminates a second central region of the base 22. An electrical bias applied between the first conductors 26 and the second conductors 32 adjusts an interferometric cavity defined by the first and second mirrors, 24 and 30, to produce transmitted interference light T and reflected interference light R.

Figure 2:
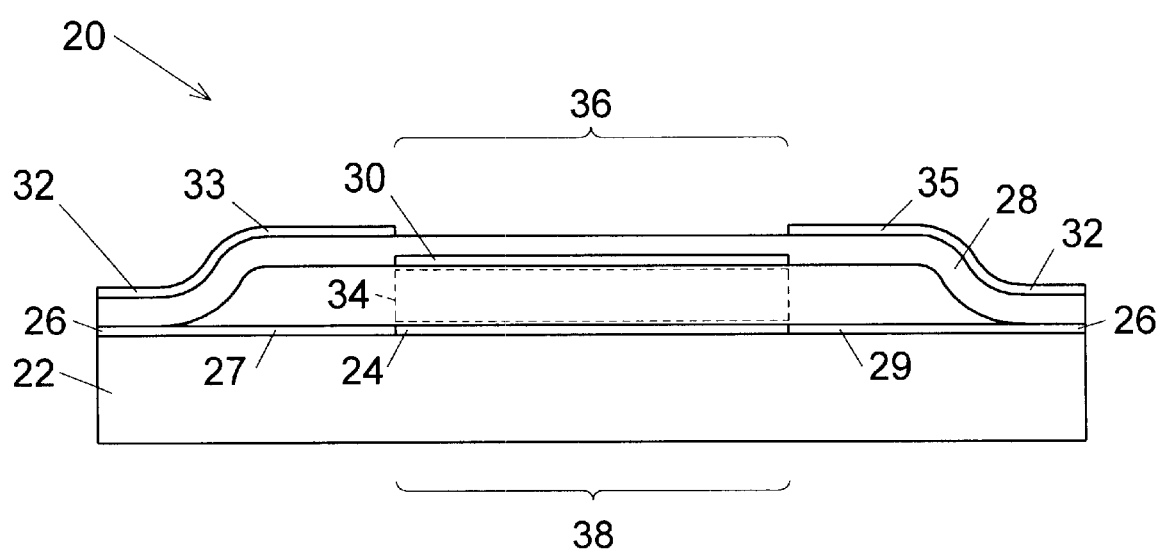
FIG. 2 illustrates a side view of the preferred interferometric light modulator of the present invention.

A side view of the preferred interferometric light modulator 20 is illustrated in FIG. 2, which shows the base 22, the first mirror 24, the first conductors 26, the ribbon 28, the second mirror 30, and the second conductors 32. The base 22 is also referred to as a substrate. Preferably, the base 22 is comprised of Si because the Si is transparent for the incident light at a 1.55 μm wavelength band, which is used for many optical communications applications. The first and second mirrors, 24 and 30, are preferably multilayered dielectric mirrors. Preferably, the first and second mirrors, 24 and 30, have first and second specific reflection coefficients, respectively, which are chosen for a particular application. The first mirror 24 is also referred to as a substrate reflector or a base reflector. The second mirror 30 is also referred to as a ribbon reflector or a beam reflector. The first and second mirrors, 24 and 30, define the interferometric cavity 34. Preferably, the first and second conductors, 26 and 32, comprise Al. The second conductors 32 are divided into a first conductive element 33 and a second conductive element 35. The first conductors 26 are divided into a third conductor element 27 and a fourth conductor element 29. The ribbon 28 is also referred to as a beam or a flexible beam. Preferably, the ribbon 28 is comprised of $Si_3N_4$, which is transparent for the incident light at the 1.55 μm wavelength band. Preferably, the first central region 36 comprises an entrance window and the first and second central regions, 36 and 38, comprise exit windows for the preferred interferometric light modulator 20 of the present invention.

Figure 3:
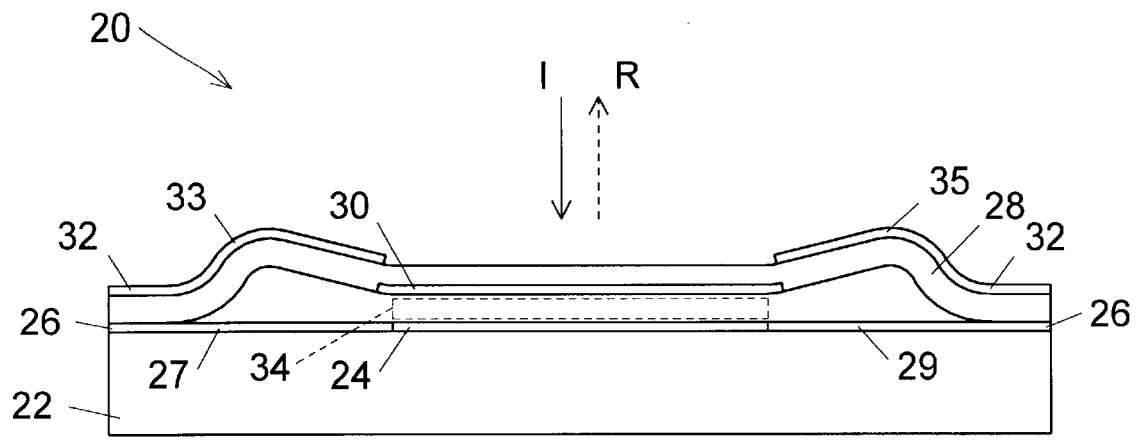
FIG. 3 illustrates operation of the preferred interferometric light modulator of the present invention in a reflection mode.

The preferred interferometric light modulator 20 of the present invention operating in a reflection mode is illustrated in FIG. 3. An electrical bias is applied between the first and second conductors, 26 and 32. The electrical bias adjusts the interferometric cavity 34. Multiple beam interference occurs between the first and second mirrors, 24 and 30, which define the interferometric cavity 34. The multiple beam interference produces the reflected interference light R. The reflected interference light R includes relatively wide wavelength bands of light separated by relatively narrow wavelength bands of dark.

Figure 4:
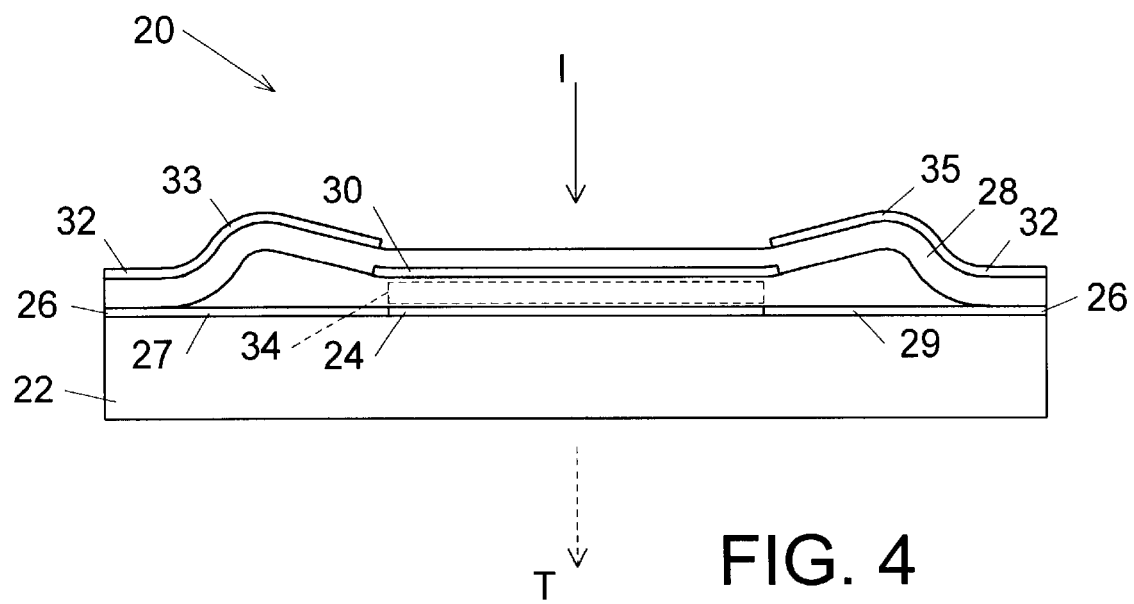
FIG. 4 illustrates operation of the preferred interferometric light modulator of the present invention in a transmission mode.

The preferred interferometric light modulator 20 of the present invention operating in a transmission mode is illustrated in FIG. 4. The electrical bias applied between the first and second conductors, 26 and 32, adjusts the interferometric cavity 34 producing the multiple beam interference. The multiple beam interference produces the transmitted interference light T. The transmitted interference light T includes relatively narrow wavelength bands of light separated by relatively wide wavelength bands of dark.

It will be readily apparent to one skilled in the art that the preferred interferometric light modulator 20 can be operated in both the reflection and transmission modes simultaneously. Further, it will be readily apparent to one skilled in the art that the reflected interference light R and the transmitted interference light T are complements of each other. Moreover, it will be readily apparent to one skilled in the art that the relatively wide wavelength bands of light for the reflected interference light R correspond to the relatively wide wavelength bands of dark for the transmitted interference light T while the relatively narrow wavelength bands of dark for the reflected interference light R correspond to the relatively narrow wavelength bands of light for the transmitted interference light T.

An advantage of the preferred interferometric light modulator 20 over the prior art is that, because the first and second conductors, 26 and 32, are symmetric about a center of the ribbon 28 and because the second conductors 32 are located away from the second mirror 30, the first and second mirrors, 24 and 30, remain parallel when the electrical bias is applied between the first and second conductors, 26 and 32. Consequently, the interferometric cavity 34 maintains a constant height across the interferometric cavity 34 throughout operation. A further advantage of the preferred interferometric light modulator 20 of the present invention over the prior art is that the preferred interferometric light modulator does not use the narrow arms of the prior art. Moreover, an additional advantage of the preferred interferometric light modulator 20 of the present invention is that the preferred interferometric light modulator operates in both reflection and transmission.

The preferred method of fabricating the preferred interferometric light modulator 20 of the present invention utilizes semiconductor fabrication techniques and is described with reference to FIG. 2. The preferred method begins with the base 22, which is an optically transparent substrate. In a first step, the mirror 24 is deposited on the base 22. In a second step, the first conductors 26 are deposited on the base 22. In a third process step, a sacrificial layer is formed underneath what will be the ribbon 28 and what will be the second mirror 30. The sacrificial layer preferably comprises Si. In a fourth step, the second mirror 30 is fabricated on the sacrificial layer. In a fifth step, the ribbon 28 is fabricated on the sacrificial layer and on the second mirror 30. In a sixth process step, the second conductors 32 are fabricated on the ribbon 28. In a seventh process step, the sacrificial layer is etched to completion, preferably using a $XeF_2$ etch of the Si.

In a first alternative interferometric light modulator of the present invention, the base 22 and the ribbon 28 are comprised of a material that is transparent for a visible spectrum. Preferably, the material is a dielectric material.

In a second alternative interferometric light modulator of the present invention, the first mirror 24 is a metal mirror.

In a third alternative interferometric light modulator of the present invention, the second mirror 28 is the metal mirror.

In a fourth alternative interferometric light modulator of the present invention, the second central region 38 comprises the entrance window and the first and second central regions, 36 and 38, comprise the exit windows.

In a fifth alternative interferometric light modulator of the present invention, the second mirror 30 is located on an opposite side of the ribbon 28 from what is depicted in FIGS. 1–4. In the fifth alternative interferometric light modulator, the second mirror 30 is located directly between the second conductors 32 on a ribbon surface which includes the second conductors 32.

In a first alternative method of fabricating the fifth alternative interferometric light modulator of the present invention, the fourth and fifth steps of the preferred method are reversed. In the first alternative method, the ribbon 28 is fabricated on the sacrificial layer and the mirror 30 is fabricated on the ribbon 28.

Applications for the preferred and alternative interferometric light modulators of the present invention include telecommunications and imaging applications.

The telecommunications applications include use as a switch, a low-bandwidth transceiver, an attenuator, and a filter for specific wavelengths. Examples of the filter for specific wavelengths include a narrow bandpass filter and a narrow band stop filter. For the narrow bandpass filter, the interferometric light modulator is operated in the transmission mode. For the narrow bandstop filter, the interferometric light modulator is operated in the reflection mode.

The imaging applications include use of a linear array of the interferometric light modulators for print and display applications. In the print applications, the linear array of the interferometric light modulators produces a line image on a drum or print media. A scanning motion of the drum or print media in concert with modulation of the line image produces a two dimensional image in the print application. In a first display system, the linear array of interferometric light modulators produces the line image which is scanned to provide a virtual image to a user who is looking into the first display system. In a second display system, the linear array of interferometric light modulators projects the line image onto a display screen while the line image is scanned across the display screen to produce a real image on the display screen.

It will be readily apparent to one skilled in the art that other various modifications may be made to the preferred embodiment without departing from the spirit and scope of the invention as defined by the appended claims.

I claim:

1. An interferometric light modulator comprising:
   a. a base;
   b. a beam suspended above the base and having first and second ends, a first conductive region proximate the first end of the beam, a second conductive region proximate the second end of the beam; and
   c. means for biasing the first and second conductive regions relative to the base such that the base and the beam form an interferometric cavity and further such that light entering the interferometric cavity is modulated in response to the means for biasing, wherein the beam comprises an entrance window for the light and further wherein the base comprises an exit window for the light.

2. An interferometric light modulator comprising:
   a. a base;
   b. a beam suspended above the base and having first and second ends, a first conductive region proximate the first end of the beam, a second conductive region proximate the second end of the beam; and
   c. means for biasing the first and second conductive regions relative to the base such that the base and the beam form an interferometric cavity and further such that light entering the interferometric cavity is modulated in response to the means for biasing, wherein the beam comprises an entrance window for the light and the beam comprises an exit window for the light.

3. An interferometric light modulator comprising:
   a. a base comprising a semiconductor substrate;
   b. a beam suspended above the base and having first and second ends, a first conductive region proximate the first end of the beam, a second conductive region proximate the second end of the beam; and
   c. means for biasing the first and second conductive regions relative to the base such that the base and the beam form an interferometric cavity and further such that light entering the interferometric cavity is modulated in response to the means for biasing.

4. The interferometric light modulator of claim 3 wherein the semiconductor substrate comprises a silicon substrate.

5. A light modulator comprising:
   a. a semiconductor substrate;
   b. a flexible beam suspended above the semiconductor substrate, the flexible beam having a central portion located between first and second ends, the beam having first and second electrical conducting layers, the first electrical conducting layer located between the first end and the central portion of the flexible beam, the second electrical conducting layer located between the central portion and the second end of the flexible beam; and
   means for electrically biasing the first and second electrical conducting layers relative to the semiconductor substrate such that a distance between the central portion of the flexible beam and the semiconductor substrate is variable and further such that the central portion of the flexible beam and the semiconductor substrate form a variable interference cavity for light.

6. A light modulator comprising:
   a. a base comprising a semiconductor substrate;
   b. a ribbon suspended above the base and having a central region and first and second conducting regions located outside of the central region; and
   c. means for biasing the first and second conducting regions such that a distance between the central region of the ribbon and the base is variable and further such that the central region of the ribbon and the base forms a variable interference cavity for light.

7. A light modulator comprising:
   a. a base comprising a semiconductor substrate and having first and second conductive regions, the first conductive region coupled to the second conductive region;
   b. a ribbon suspended above the base and having a central portion and third and fourth conductive regions located outside of the central region, the third conductive region coupled to the fourth conductive region such that an electrical bias applied to the third and fourth conductive regions relative to the first and second conductive regions varies a distance between the central portion of the ribbon and the base and further such that the central portion of the ribbon and the base form a variable interference cavity for light.

* * * * *